UNITED STATES PATENT OFFICE.

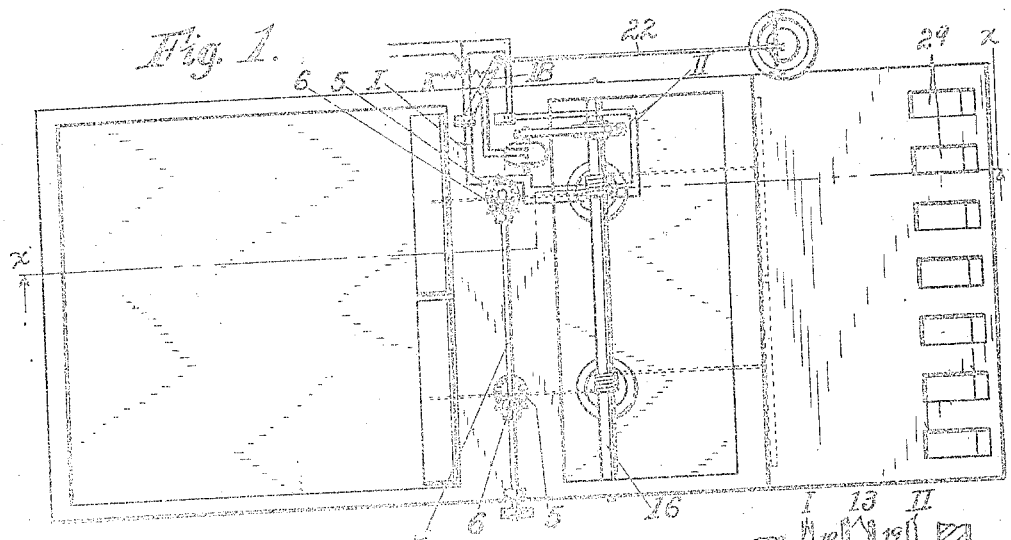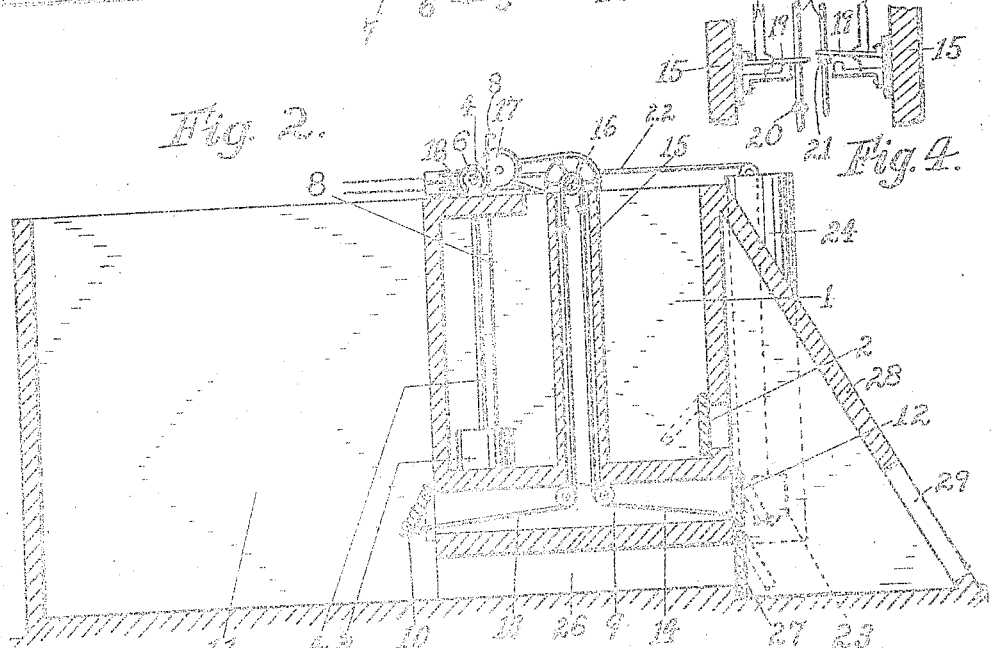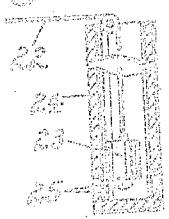

PERLEY HALE, OF SAN DIEGO, CALIFORNIA.

TIDE-MOTOR.

1,076,498.

Specification of Letters Patent.  Patented Oct. 21, 1913.

Application filed January 24, 1913. Serial No. 743,927.

*To all whom it may concern:*

Be it known that I, PERLEY HALE, a citizen of the United States, and a resident of the city of San Diego, county of San Diego, and State of California, have invented certain new and useful Improvements in Tide-Motors, of which the following is a specification.

My invention relates to improvements in tide motors and has for its object the provision of an improved tide motor of simple construction and efficient in operation.

The invention consists in the combinations and arrangements of parts hereinafter described and claimed.

The invention will be best understood by reference to the accompanying drawings forming a part of this specification, and in which, Figure 1 is a top plan view of a tide motor embodying my invention, Fig. 2, a section taken on line x—x of Fig. 1, Fig. 3, a small detail view of a well and float employed for automatically controlling the operation of the device, and Fig. 4, a detail view of circuit breakers employed in automatically controlling the operation of the device.

The preferred form of construction as illustrated in the drawings comprises a power reservoir 1 having one or more automatically opening inlet valves 2 which are arranged to open automatically to permit entry of water from the sea and close automatically to prevent escape of water from reservoir 1. One or more turbine water wheels 3 of any usual or desired construction, are arranged at the bottom of the reservoir 1 and are adapted to be operated by water escaping from said reservoir, as will be readily understood by those skilled in the art. Each of the water wheels is arranged to operate a vertically disposed shaft 4 which extends above the top of reservoir and is adapted to operate as a suitable means for transmitting power from the motor. A rod 8 is extended downwardly from the top of reservoir 1 and is connected to operate the ordinary controlling means or valves of each of the water wheels 3 as will be readily understood by those skilled in the art. One or more flumes 9 are arranged under reservoir 1 and are provided at their inner ends with automatically swinging valves 10 adapted to permit entry of water from the corresponding flumes 9 into a waste reservoir 11, but to prevent passage of the water from said waste reservoir into said flume. At their outer ends flumes 9 are provided with swinging valves 12 adapted to permit escape of water from the corresponding flume 9 into the open sea but prevent entry of water from the sea to the corresponding flumes.

Operating cables 13 and 14 are connected with valves 10 and 12 respectively and are extended upwardly through suitable wells 15 formed in reservoir 1 and are wound at their upper ends upon an operating shaft 16. By this arrangement it will be observed that upon rotating shaft 16 in one direction one of the valves 10 or 12 will be closed and the other permitted to open, and that when shaft 16 is rotated in the reverse direction the opposite valve will be permitted to open and the other one closed. Shaft 16 is driven from an electric motor 17 by means of a suitable belt as indicated, and the operation of motor 17 is controlled by means of a spring held switch 18 which is adapted to be shifted to two different positions to reverse the direction of currents through said motor and thus reverse the direction as will be readily understood by those skilled in the art. Bridging circuits I and II are connected with the circuits on motor 17 and also with suitable circuit breakers 19 arranged in one of the wells 15 as indicated. Cables 13 and 14 are passed through the ends of circuit breakers 19 and are provided with knots or stops 20 and 21 adapted to engage said circuit breakers as indicated in Fig. 4. The arrangement is such that when cable 14 is wound upon shaft 16 it closes valve 12, and knot 21 engages the corresponding circuit breaker 19 and breaks bridging circuit II, thus interrupting the operation of motor 17 and consequently stopping the action of shaft 16. Likewise when cable 13 is wrapped upon shaft 16 knot 20 engages the corresponding circuit breaker 19 to break bridging circuit I and thus interrupt the action of the motor in that direction. The spring held switch 18 is operated by means of a cable 22 connected with a float 23 operating in a well 24 having openings 25 at its bottom adapted to give free access of the sea to said well. The arrangement of the float 23 and its connections are such that when the tide falls so that the sea level is below valve 12, switch 18 is operated by the weight of float 23 to shift switch lever 18 to the position indicated in Fig. 1 which causes operation of motor 17 to close valve 10 and permit automatic opening of valve 12. This permits the discharge from water wheels 3 to pass directly out to the sea and thus prevents operation of the water in reservoir 1 against a head in reservoir 11. When the tide rises and float 23 is raised, said float releases switch lever 18 and its spring operates the same to close the other circuit of motor 17 thus causing operation of shaft 16 to close valve 12 and open valve 10 thus permitting operation of the water wheels 3 while the tide is rising.

One or more second flumes 26 are arranged under flumes 9 and provided at their outer ends with automatically closing swinging valves 27 which are adapted to permit escape of water from waste reservoir 11 when the tide falls sufficiently, but prevent entry of water to reservoir 11 when the tide rises. By this arrangement it will be observed that waste reservoir 11 will be automatically drained at each low tide. A protecting apron 28 is arranged over the exposed side of the construction and provided with suitable openings 29 adapted to permit passage of the sea water thereto, said apron being designed for protection of the parts from the force of waves and also to direct the waves into the open top of reservoir 1 thus increasing the height of water therein above that of ebb tide.

The different reservoirs, flumes and apron may be made of any suitable or desirable material but I prefer the use of reinforced concrete, which will be found highly efficient in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A tide motor comprising a power reservoir; power developing means arranged to be operated by water from said reservoir; a waste reservoir; and means for directing the discharge from said power developing means into said waste reservoir or into the open sea, substantially as described.

2. A tide motor comprising a power reservoir; power developing means arranged to be operated by water from said reservoir; a waste reservoir; means for directing the discharge from said power developing means into said waste reservoir or into the open sea; and means automatically controlled by the sea level arranged to control said discharging means, substantially as described.

3. A tide motor comprising a power reservoir; power developing means arranged to be operated by water from said reservoir; a waste reservoir; means for directing the discharge from said power developing means into said waste reservoir or into the open sea; and float operating means automatically controlled by the sea level arranged to control said discharging means, substantially as described.

4. A tide motor comprising a power reservoir; an automatic valve for said reservoir arranged to permit entry of water thereto but prevent its escape; a water wheel arranged to be operated by water from said reservoir; a waste reservoir; a flume leading from said reservoir into said open sea and arranged to receive the discharge from said water wheel; a valve at each end of said flume; means for opening and closing said valves; a second flume leading from said waste reservoir to the open sea; and an automatically operating valve for said second flume adapted to permit escape of water to the sea but prevent entry of water to said waste reservoir, substantially as described.

5. A tide motor comprising a power reservoir; an automatic valve for said reservoir arranged to permit entry of water thereto but prevent its escape; a water wheel arranged to be operated by water from said reservoir; a waste reservoir; a flume leading from said waste reservoir to the open sea and arranged to receive the discharge from said water wheel; a valve at each end of said flume; float controlled electrical means for opening and closing said valves; a second flume leading from said waste reservoir to the open sea; and an automatically opening valve for said second flume adapted to permit escape of water to the sea but prevent entry of water to said waste reservoir, substantially as described.

In testimony whereof I have signed my name to this specification in the presence of two subscribing witnesses.

PERLEY HALE.

Witnesses:
JAMES E. O'KEEFE,
IRMA E. TRIPLITT.